(12) United States Patent
Inman et al.

(10) Patent No.: US 9,534,577 B2
(45) Date of Patent: Jan. 3, 2017

(54) APPARATUS FOR DOWNHOLE POWER GENERATION

(71) Applicants: Paul Noel Inman, Lydney (GB); Neil Scott Wilson, Abbeymead (GB); Adan Hernandez Herrera, Baytown, TX (US)

(72) Inventors: Paul Noel Inman, Lydney (GB); Neil Scott Wilson, Abbeymead (GB); Adan Hernandez Herrera, Baytown, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 204 days.

(21) Appl. No.: 14/295,946

(22) Filed: Jun. 4, 2014

(65) Prior Publication Data

US 2015/0068298 A1     Mar. 12, 2015

Related U.S. Application Data

(63) Continuation of application No. 13/390,414, filed as application No. PCT/GB2009/002009 on Aug. 18, 2009, now Pat. No. 8,957,538.

(51) Int. Cl.
    *E21B 47/00*      (2012.01)
    *F03B 13/02*      (2006.01)
    (Continued)

(52) U.S. Cl.
    CPC ............... *F03B 13/02* (2013.01); *E21B 21/10* (2013.01); *E21B 34/105* (2013.01);
    (Continued)

(58) Field of Classification Search
    CPC .......... E21B 47/00; E21B 47/09; E21B 47/12; E21B 47/01; E21B 47/011; F03B 13/02; F03B 13/10; F03B 15/06
    (Continued)

(56) References Cited

U.S. PATENT DOCUMENTS 3,163,816 A    12/1964   Clements et al.
4,155,022 A    5/1979   Crockett
(Continued)

FOREIGN PATENT DOCUMENTS

RU          2109940 C1    4/1998
WO      2007137424 A    12/2007

OTHER PUBLICATIONS

Intellectual Property Office, Combined Search and Examination Report under Section 17 and 18(3), Application No. GB1320609.9, which is a divisional of the GB counterpart to the instant application, Dec. 12, 2013.

(Continued)

*Primary Examiner* — Eric S McCall
*Assistant Examiner* — Mohammed E Keramet-Amircolai
(74) *Attorney, Agent, or Firm* — Howard L. Speight, PLLC

(57) ABSTRACT

Apparatus is provided for use in power generation, including a fluid-flow-driven power generator for use in a fluid-containing pipe such as a drill pipe as used in oil and gas exploration and extraction. Parts of the generator are removable from the pipe—for example while a drill pipe is downhole within a drilling well—to leave a clear through bore for survey and fishing operations and to enable replacement of the removed parts. The flow-driven generator comprises an impeller connected to a magnet assembly to rotate the magnet assembly when fluid flows past the impeller. This causes relative movement between the magnet assembly and an adjacent electrical coil assembly, the relative movement and magnetic coupling generating an electrical current in the coil assembly. This generated electrical current is used to power electrical devices within the pipe.

10 Claims, 15 Drawing Sheets

(51) Int. Cl.
*E21B 21/10* (2006.01)
*E21B 34/10* (2006.01)
*E21B 41/00* (2006.01)
*F03B 13/10* (2006.01)
*F03B 15/06* (2006.01)

(52) U.S. Cl.
CPC .......... *E21B 41/0085* (2013.01); *E21B 47/00* (2013.01); *F03B 13/10* (2013.01); *F03B 15/06* (2013.01)

(58) Field of Classification Search
USPC .......................................... 73/152.54, 152.46
See application file for complete search history.

(56) References Cited

U.S. PATENT DOCUMENTS

| | | | |
|---|---|---|---|
| 4,415,823 A | 11/1983 | Jurgens | |
| 4,732,225 A | 3/1988 | Jurgens et al. | |
| 5,839,508 A * | 11/1998 | Tubel | G01V 1/42 166/65.1 |
| 6,717,283 B2 | 4/2004 | Skinner et al. | |
| 6,864,593 B2 | 3/2005 | Winnacker et al. | |
| 7,002,261 B2 | 2/2006 | Cousins | |
| 7,537,051 B1 | 5/2009 | Hall et al. | |
| 7,624,821 B1 | 12/2009 | Hall et al. | |
| 8,033,328 B2 | 10/2011 | Hall et al. | |
| 8,035,244 B2 * | 10/2011 | Sutherland | E21B 41/0085 290/43 |
| 2002/0162654 A1 | 11/2002 | Bauer et al. | |
| 2003/0133783 A1 | 7/2003 | Brock et al. | |
| 2007/0119630 A1 | 5/2007 | Hall et al. | |
| 2008/0284174 A1 * | 11/2008 | Nagler | F03B 13/00 290/54 |
| 2009/0114396 A1 | 5/2009 | Kusko et al. | |

OTHER PUBLICATIONS

Intellectual Property Office, Notification of Grant: Patent Serial No. GB2507200, application No. GB1320610.7, which is a divisional of the GB counterpart to the instant application, May 6, 2014.
Discovery House, Australian Government IP Australia, Patent Examination Report No. 1, Patent Application No. 2014280874, which is an AU counterpart to the instant application, Oct. 21, 2015.
United States Patent and Trademark Office, Notice of Allowance and Fee(s) due, U.S. Appl. No. 13/390,414, which is a US parent of the instant application, Nov. 26, 2014.
Discovery House, IP Australia, Patent Examination Report No. 1 in AU Application No. 2009351363, which is the AU counterpart to the instant application, issued on Sep. 20, 2013.
Discovery House, IP Australia, Patent Examination Report No. 2 in AU Application No. 2009351363, which is the AU counterpart to the instant application, issued on Aug. 19, 2014.
English abstract for RU2109940, espacenet database, accessed on Mar. 6, 2010.
Intellectual Property Office, Combined Search and Examination Report under Section 17 and 18(3), Application No. GB1320609.9, which is a divisional of the GB counterpart to the instant application, Dec. 12, 2014.
Intellectual Property Office, Combined Search and Examination Report under Section 17 and 18(3), Application No. GB1320610.7, which is a divisional of the GB counterpart to the instant application, Dec. 12, 2013.
Intellectual Property Office, Examination Report under section 18(3), Application No. GB1116393.8, which is the GB counterpart to the instant application, May 8, 2013.
Intellectual Property Office, Examination Report under section 18(3), Application No. GB1116393.8, which is the GB counterpart to the instant application, Jan. 8, 2014.
Intellectual Property Office, Notification of Grant: Patent Serial No. GB2480588, Application No. GB1116393.8, which is the GB counterpart to the instant application, Mar. 18, 2014.
Intellectual Property Office, Notification of Grant: Patent Serial No. GB2505124, Application No. GB1320209.9, which is a divisional of the GB counterpart to the instant application, Mar. 18, 2014.
International Preliminary Report on Patentability, Feb. 21, 2012, PCT/GB2009/002009, which is the parent PCT application of the instant application.
Patent Directorate, Intellectual Property Office, Great Britain, Patents Act 1977: Examination Report Under Section 18(3) in Application GB1116393.8, which is the counterpart UK matter to the instant matter, issued on Oct. 24, 2013.
PCT/GB2009/002009 International Search Report, Nov. 16, 2010.

* cited by examiner

SECTION C-C
SCALE 1 : 2

SECTION D-D
SCALE 1 : 2

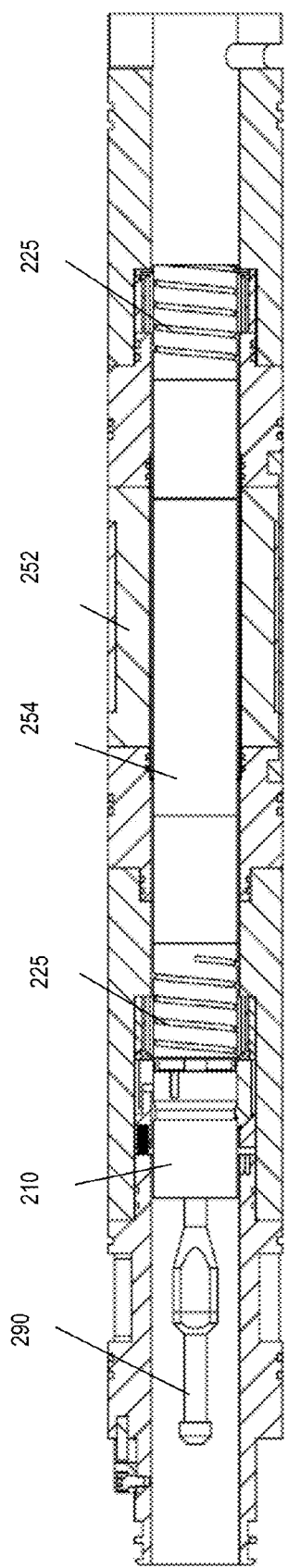

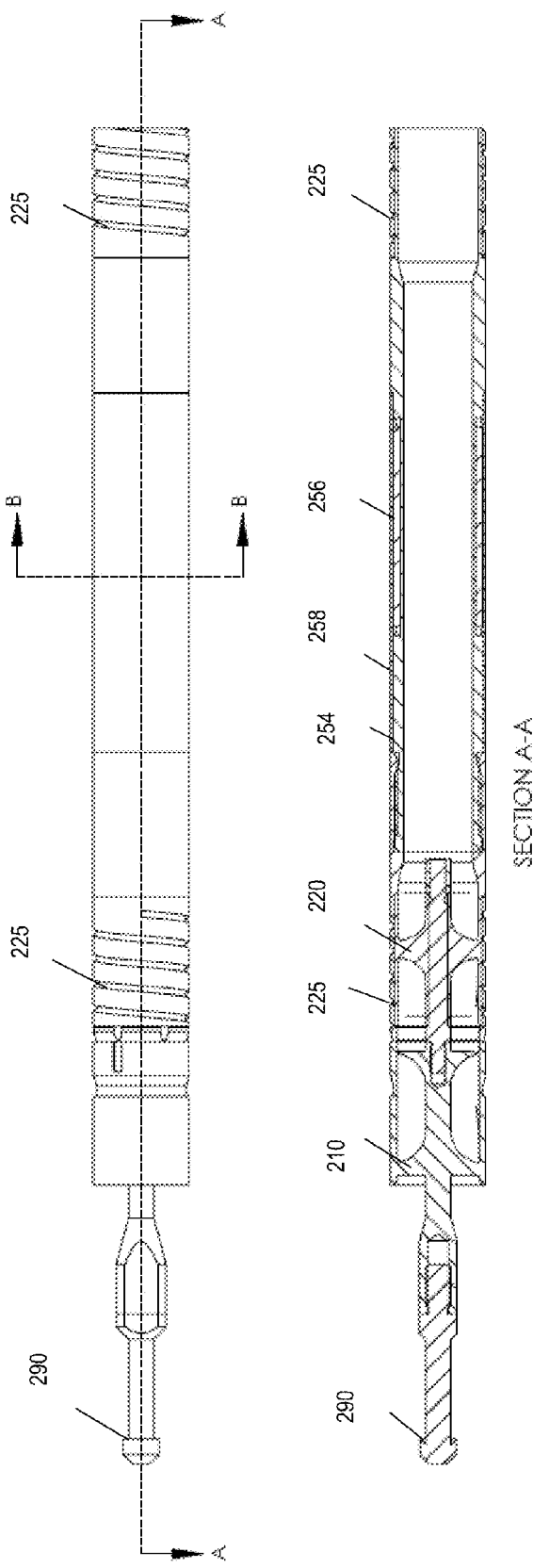
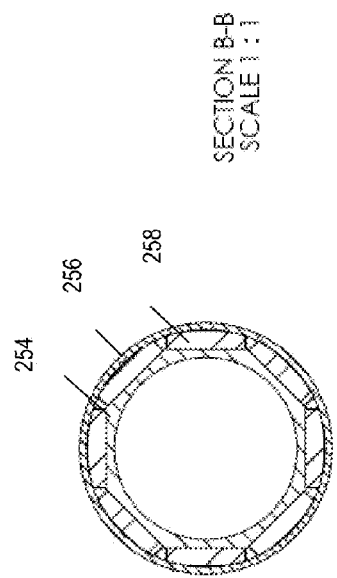
FIG. 2B
FIG. 2C
FIG. 2D

SECTION A - A

DETAIL B
SCALE 2 : 5

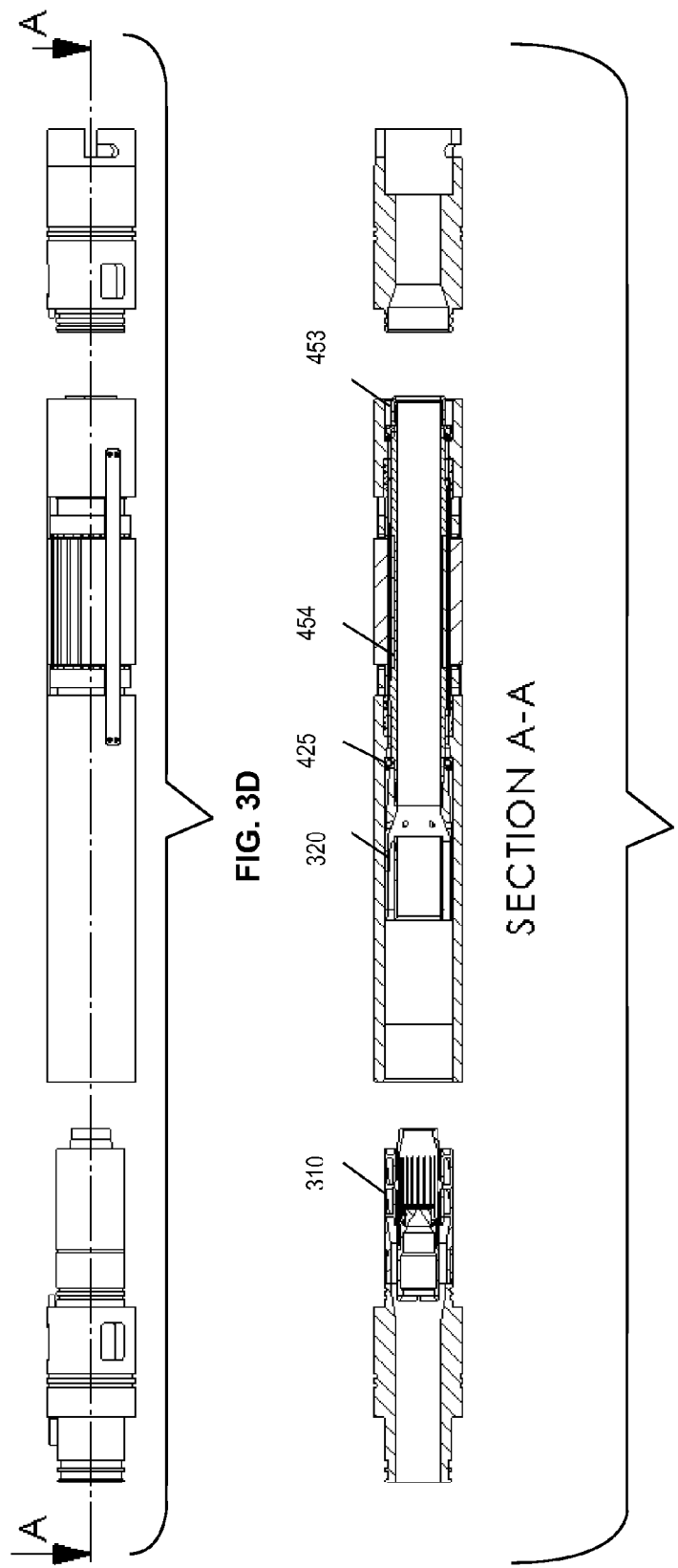

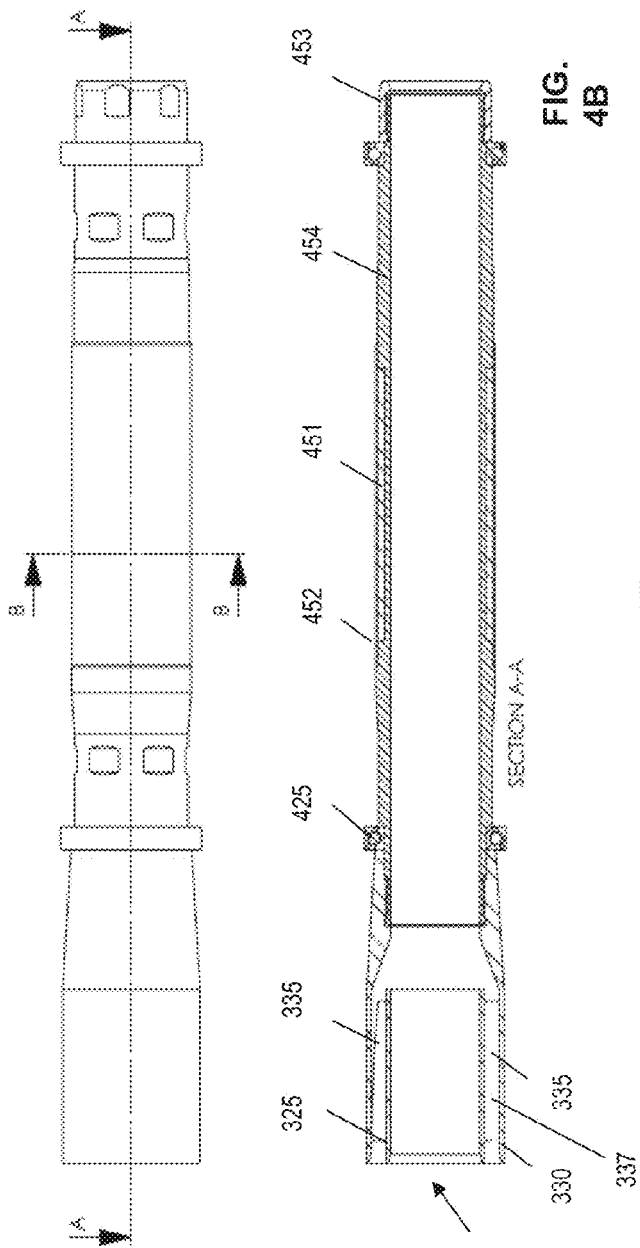

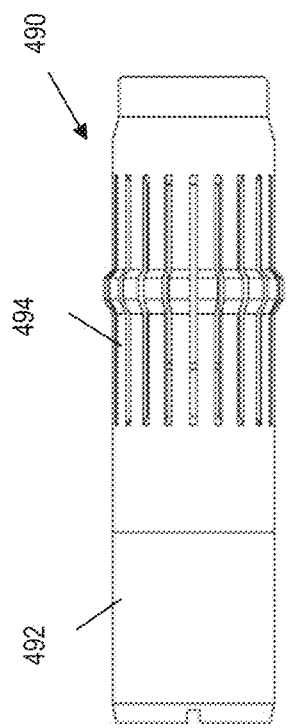
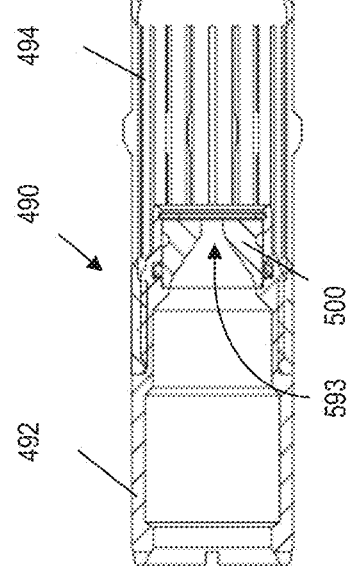
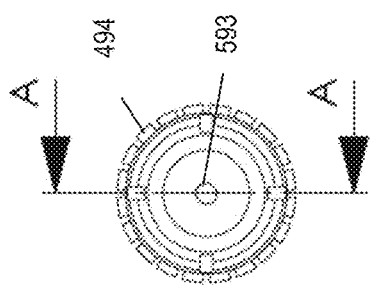
FIG. 5A
FIG. 5B
SECTION A-A
FIG. 5C

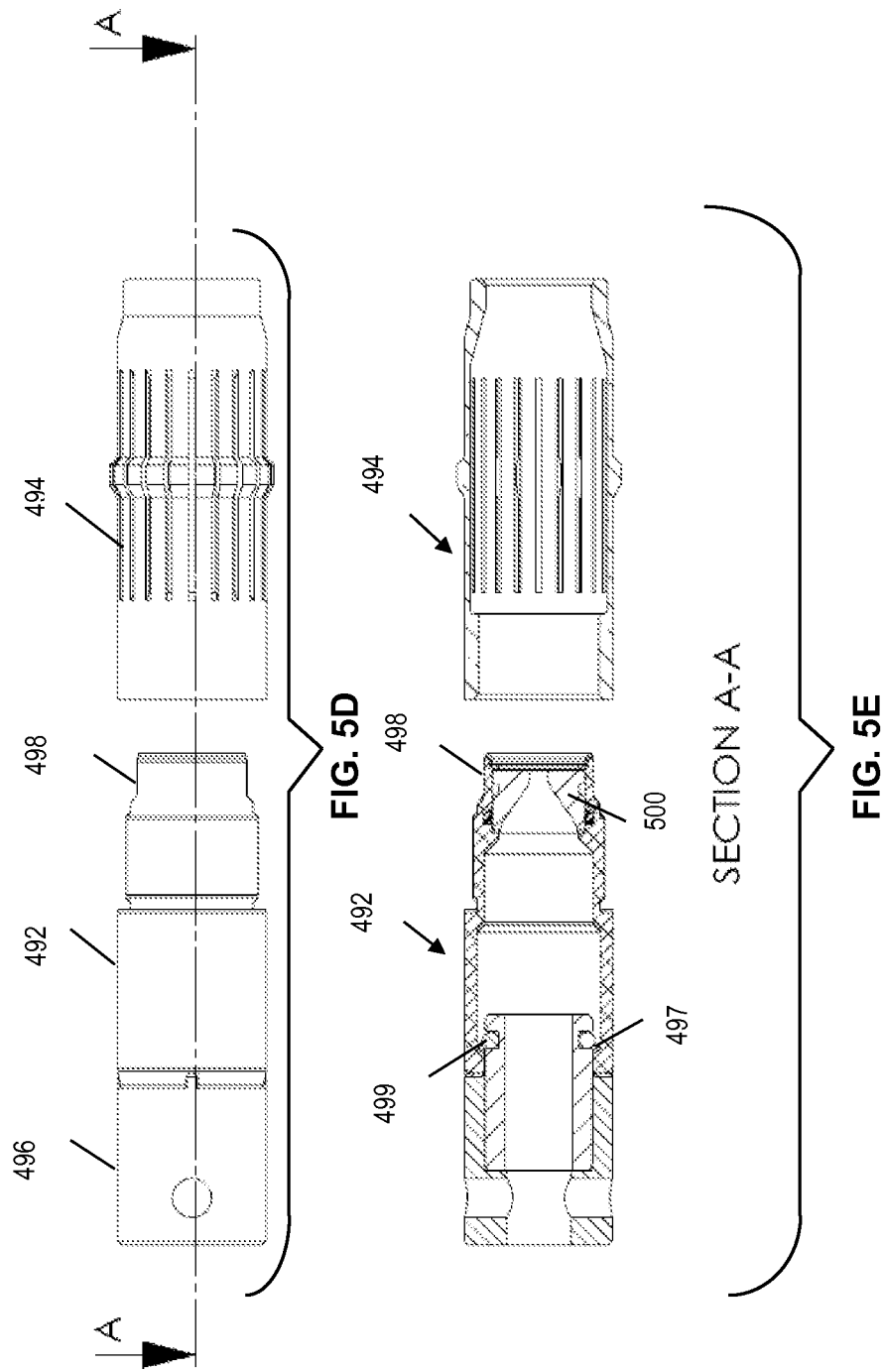

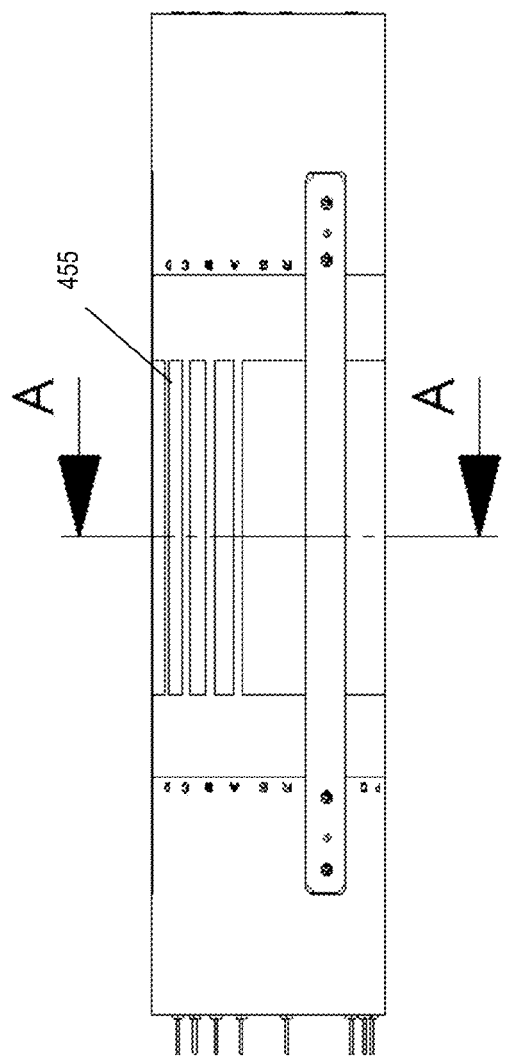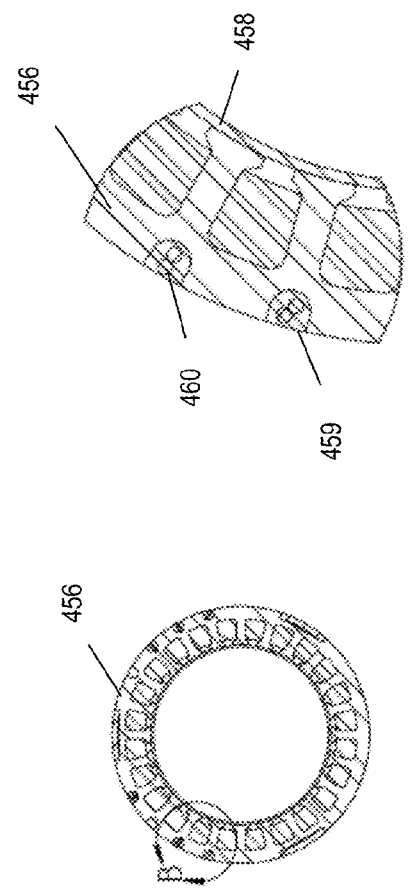

APPARATUS FOR DOWNHOLE POWER GENERATION

CROSS-REFERENCE TO RELATED APPLICATIONS

This application is a continuation of U.S. patent application Ser. No. 13/390,414, filed Feb. 14, 2012, which is the National State of International Application No. PCT/GB2009/002009, filed Aug. 18, 2009. Each patent application identified above is incorporated herein by reference in its entirety to provide continuity of disclosure.

FIELD OF INVENTION

The present invention relates to power generators for use in fluid containing pipes, such as in downhole drilling environments in the oil and gas exploration and extraction industry. Generators according to the invention are particularly applicable to measurement while drilling (MWD) applications in which power is required by measurement sensors and/or communications components in a drilling well.

BACKGROUND

Oil and gas exploration and extraction require well drilling to ever increasing depths, which increases the challenges associated with providing power to measurement devices close to the drilling location and in telemetry repeaters at intervals along the drill string. Wireline measurement tools that require electrical cabling to be provided from the surface to extreme well depths cannot be used during drilling, and conventional batteries do not provide adequate power, are relatively expensive for their usable life, and the cost of periodically replacing depleted batteries is prohibitive because of the high cost of delayed drilling while a MWD tool is removed.

However, downhole generators are known that operate on the principle of extracting energy from the flow of drilling 'mud' through the bore of the drill pipe. As is well known in the art, a drilling fluid is pumped downhole to cool the drill bit and to provide lubrication and remove cuttings, and the flow of this fluid provides a source of energy that can be exploited to power electrical components.

Conventional flow-based generator systems involve turbine blades within the fluid flow pipe, which transmit energy via a central shaft to an on-axis electrical generator. A bladed stator may impart angular velocity to the fluid flow before it reaches the turbine blades.

A problem with these known solutions is that their arrangements of the flowgear (e.g. an arrangement in which the bladed stator and turbine blades project from an outer surface of the generator) make retrieval of the flowgear or the generator extremely difficult or impossible during downhole operations. Their wires for electrical power connection between the generator and tool casing contribute to this difficulty.

Thus, it is impossible to change the flowgear on conventional generators, either to replace damaged parts or to change the flow rate, without removing the generator from the tool string for re-work (typically in a district workshop away from the drilling rig). To continue drilling without major delays requires additional spare generators which represent a large capital asset investment, but the drilling delay inherent in tripping the drill string to remove the generator is very costly even if the generator can be promptly replaced. The inventors of the present invention have recognized that it is desirable to improve the ease with which flowgear can be interchanged, or indeed to provide a system where such changes are minimised or eliminated. Another problem with known generators implemented within a drill collar insert is that they typically fail to provide an adequate power output for some applications, and fail to provide a sufficiently stable output. It is also desirable to mitigate the other problems described above.

BRIEF DESCRIPTION OF DRAWINGS

Embodiments of the invention are described below, by way of example, with reference to the accompanying drawings in which:

FIG. 2A is a cross sectional view of a first example of a fluid-flow driven power generator according to an embodiment of the present invention, for use in a drill pipe or a similar tubular structure; and FIG. 2B is a plan view of the fluid-flow driven power generator of FIG. 2A; and FIGS. 2C and 2D are cross sectional views of the fluid-flow driven power generator of FIGS. 2A; FIG. 3D is an exploded view of the insert of FIG. 3A; and FIG. 3E is a cross sectional view of the exploded view of FIG. 3D; and FIG. 4A is a plan view of an impeller; and FIGS. 4B and 4C are cross sectional views of the impeller of FIG. 4A; FIG. 5A is a plan view of a flow control assembly; and FIGS. 5B and 5C are cross sectional views of the flow control assembly of FIG. 5A; and FIG. 5D is an exploded view of the flow control assembly of FIG. 5A; and FIG. 5E is a cross sectional exploded view of the flow control assembly of FIG. 5A.

FIG. 6B is a plan view of the stator of FIG. 6A.

FIG. 6C is a cross sectional view of the stator of FIG. 6B.

FIG. 6D is a cross sectional view showing a detail of FIG. 6C.

DESCRIPTION OF EMBODIMENTS

Figure 1A:
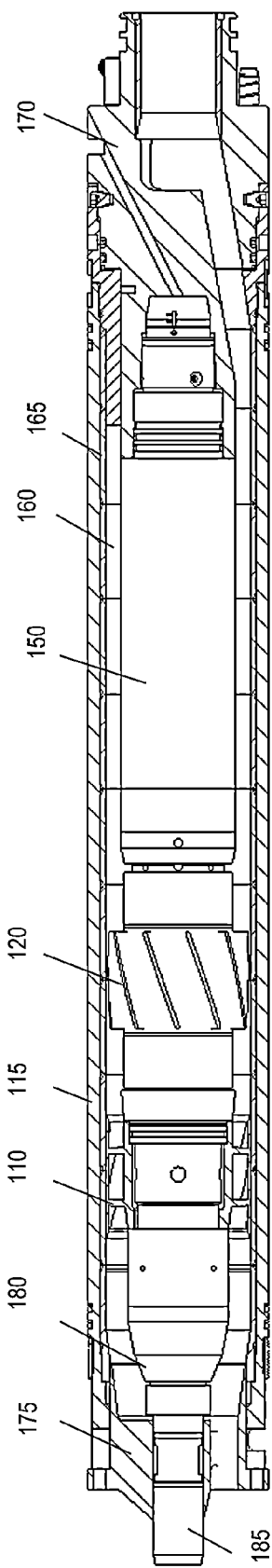
FIG. 1A is a cutaway view of a known downhole generator for insertion into a cylindrical drill pipe, the generator insert forming an arrangement located at the central longitudinal axis of the drill pipe.
Figure 1B:
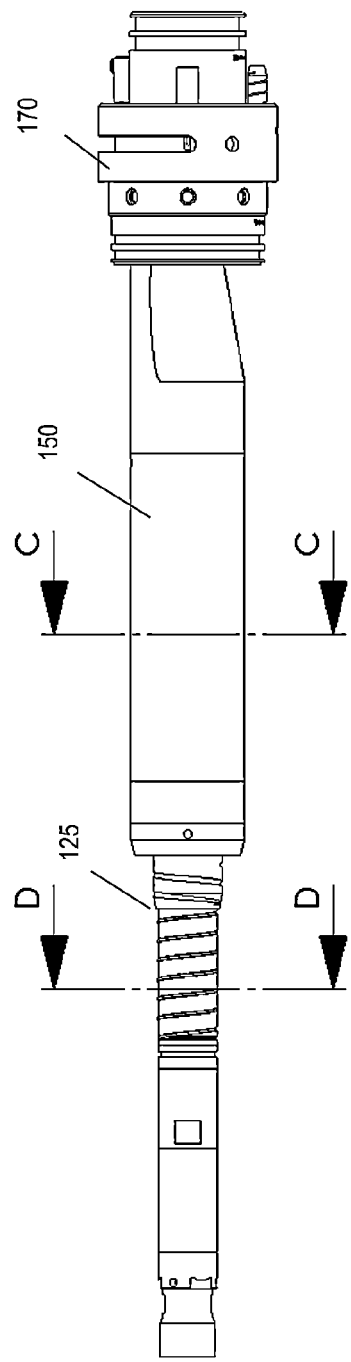
FIG. 1B is a plan view of the downhole generator of FIG. 1A.
Figure 1C:
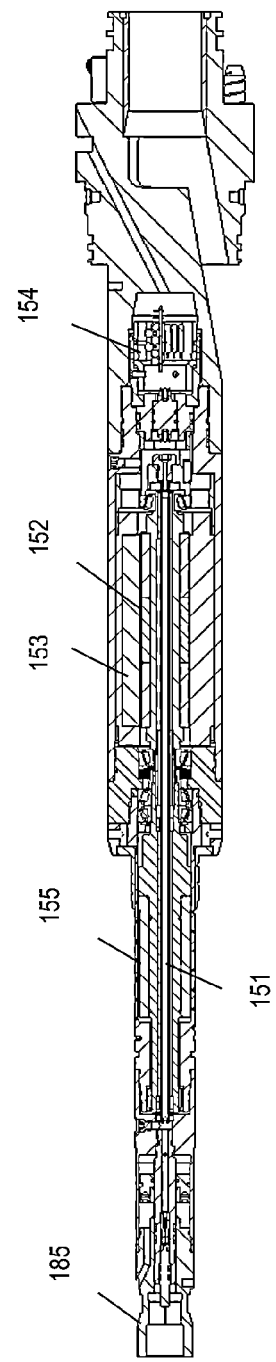
FIGS. 1C-1E are cross sectional views of the downhole generator of FIG. 1A.
Figure 1E:
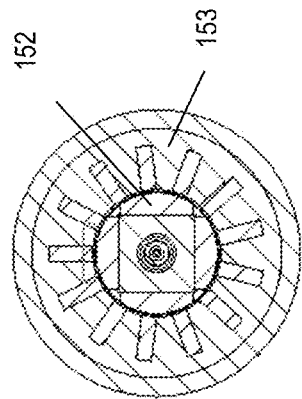
Figure 1D:
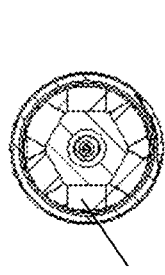

Conventional flow-based generator systems typically consist of an insert in a drill collar, the insert being located on the axis of the drill pipe. FIGS. 1A-1E show such a generator insert which would be housed inside a cylindrical drill collar. (All figures are orientated with the uphole end to the left, flow in the drill-string bore being left to right. In cross-section views, cut surfaces are hatched.)

In the known downhole generator of FIG. 1, a bladed stator 110 is fixed into a casing or flow tube 115 to impart angular velocity to the flow. A turbine 120, which has outwardly projecting rotor vanes, is mounted on a mud-lubricated bearing system 125 to extract energy from the swirling flow generated by the stator. The turbine transmits its mechanical energy via a central shaft 151 to the on-axis electrical generator 150, which houses magnets and coils.

In such generators, the narrow annular gap 160 between the flow tube and the generator body produced high flow velocities, and this requires ceramic liners 165 to minimise erosion. In the arrangement shown in FIG. 1A, electrical power from the generator is transmitted downhole (to the right) through the Bottom Interface Housing 170. The Bottom Interface Housing (or reverse flow hanger) takes the electrical connections across the fluid bore between the on-axis generator and the cylindrical tool casing or collar which houses the generator and other tools in the string. The Bottom Interface Housing also diverts the flow from the generator annulus back to the bore of the tool, and requires the application of extremely hard surface coatings to minimise erosion by the diverted flow.

One limitation of the on-axis arrangement of the generator is that it is difficult to pass additional electrical connections through the generator. In one example, a single wire was passed through the core of the generator to provide a MIL-STD-1553 serial communications connection, but locating a wire through the core of a generator renders it susceptible to electrical noise. However, with the space constraints existing within the generator there is no alternative path, and in the core there is very little space for additional wires.

At the uphole end of the generator there is an on-axis connector 185, comprising an upper interface hanger and an electrical connector. The connector 185 is supported by a low-profile centraliser 175 and enables connection to other components of an insert such as an antenna. A nose cap 180 is used to divert the flow over the nose of the generator core into the annular gap and past the bladed stator. The centralizer and nose cap are formed of, or coated with, erosion-resistant material such as tungsten carbide. A central rotor shaft 151 extends through the generator and carries magnets 152 such that they spin within the laminations and windings of the electrical stator 153. A space 154 is provided for a rectifier and other electrical control circuitry.

As noted above, there are various problems with such a generator, including the difficulty replacing damaged parts and replacing the flow gear to change the flow rate. Furthermore, the wired power connections in such generators (downhole in the example above) are either housed in shaped flownecks, which are prone to erosion damage from particles within the fluid passing through the bore within the casing, or complex arrangements are required to route wires internally without crossing the fluid flow. The particles in the fluid can disrupt fluid flow past the flownecks.

The inventors of the present invention have designed a fluid-flow-driven generator that is suitable for use in a downhole drilling environment and/or in other fluid-containing pipes, that mitigates one or more problems of known generators. Various embodiments of the invention are described below.

1. Generator with Annular Power Generation Assembly and Detachable Axially-Located Flow Controller One embodiment of the invention provides a fluid-flow-driven generator, for use in a fluid containing pipe, comprising: an annular power generation assembly comprising a fluid-flow-driven impeller coupled to one of a magnet assembly or an electrical coil assembly, the magnet assembly and the coil assembly being arranged for magnetic coupling between them and being arranged to enable relative movement between them, such that fluid flowing past the impeller causes relative rotation between the magnet assembly and the coil assembly for the generation of electrical power; and a flow controller located closer to the longitudinal axis of the pipe than the annular power generation assembly, which flow controller is detachable from the annular power generation assembly and can be removed to leave an axially-located through bore. Such an embodiment is shown in FIGS. 3A-6D.

According to one embodiment, the detachable flow controller, which is located proximate the longitudinal axis of a fluid pipe when in its operational position, can be removed from the pipe whilst the generator is in its operational position downhole. More generally, one or more removable parts of a generator according to the invention can be retrieved from a downhole drilling environment without removing the entire drill string, and the through bore can be used for survey, maintenance and/or fishing operations lower in the drill string as well as facilitating replacement of the removed parts. Various embodiments of the invention shown in the figures have this feature.

In one embodiment, the annular arrangement of the power generation comprises an insert for a fluid-containing pipe, in which all of the impeller, the coil assembly and the magnet assembly are located close to the outer circumference of the pipe insert. This is a feature of the embodiments of FIGS. 3A-6D. This not only enables a clear through-bore to be provided when one or more other parts of the generator is removed, but also enables generation of relatively high electrical power for a given fluid flow rate as compared with alternative arrangements in which either the impeller, magnet assembly or coil assembly is more centrally located.

According to one embodiment of the invention, the flow controller includes an adjustment mechanism for changing the size of a central aperture through the flow controller, thereby to control the proportion of fluid flowing through the pipe that flows past the annular impeller. In drilling applications for example, it may be desired to change the flow rate past the impeller to generate a different electrical power output at different times according to which components of the drill string need to be operated. Such periodic changes may be automated or may be controlled by a user at the surface. Alternatively, it may be desired to achieve a more constant electrical output than would normally be achieved in view of variations in the fluid flow rate through the pipe. An automated adjustment of the flow controller in response to fluid flow rates or pressure can be used to adjust the proportion of the fluid in the tube that flows past the impeller, thereby to achieve a more constant speed of rotation of the impeller and hence a more constant electrical output.

2. Generator with Removable Part(s)

One embodiment of the invention provides an electrical power generator for use in a fluid-containing pipe, such as for inserting into a tubular drill collar. The generator comprises: a magnet assembly; a coil assembly; and a fluid-flow driven impeller coupled to one of the magnet assembly and the coil assembly so as to cause rotation of the coupled assembly in response to fluid flow through the pipe. The magnet assembly and the coil assembly are arranged to enable magnetic coupling between them, and the magnet assembly and the coil assembly are mounted to enable relative movement between them in response to fluid flow through the pipe, such that said relative movement generates an electric current within the coil assembly. A first part of the generator, which first part is arranged at a position proximate a central longitudinal axis of the fluid containing pipe when in use, is a removable part that is adapted for attachment to and detachment from a second part of the generator so as to leave a central through bore when the first part is detached and removed.

In one embodiment, the generator comprises an insert for a tubular drill collar and, the insert comprises the impeller and the magnet assembly which is coupled to the impeller. The magnet assembly is arranged for magnetic coupling with a coil assembly embedded in a wall of the drill collar insert, and is rotatably mounted relative to the coil assembly. The fluid that provides mechanical energy in such an embodiment is drilling mud. The coil assembly comprises electrical wires wound around one or more magnets.

In one embodiment, such as shown in FIGS. 3A-6D, the impeller comprises an annular component having a set of rotor vanes for use in a first annular fluid flow path proximate the tubular wall of the drill collar. The removable part comprises a flow control assembly for connection to the insert at a position proximate the central longitudinal axis of the fluid-containing pipe. The flow control assembly defines a second fluid flow path along the central longitudinal axis of the fluid-containing pipe. The flow control assembly according to one embodiment comprises a combination of a spring collet having outward-facing projections on each of a plurality of fingers, and a flow controller which detachably engages the spring collet (such as by a threaded engagement or latching mechanism). The spring collet's projections are biased outwards to engage recesses in an inner wall of the drill collar insert. Alternative releasable engagement mechanisms are also possible. A set of different sized flow control nozzles are provided for use within the flow controller, and any one of them can be selected for use according to downhole characteristics such as expected fluid flow rates and loads on the generator. The proportion of the fluid flow through the drill pipe that passes along the first fluid flow path is determined by the extent to which the flow controller restricts fluid flow along the second fluid flow path. The detachable fluid flow controller can be removed from the drill pipe to leave a clear central bore through the drill pipe. In this embodiment, the magnet assembly, coil assembly and impeller can all be retained in the drill collar insert when removing the flow control assembly.

3. Drill Collar Insert with Removable Impeller and Magnet Assembly

In another embodiment, the generator again comprises an insert for a tubular drill collar, and the insert comprises the impeller and a coupled magnet assembly arranged for magnetic coupling with a coil assembly embedded in the tubular wall of the drill collar insert. However, the removable first part in this embodiment as shown in FIGS. 2A-2D comprises the impeller and the coupled magnet assembly. The removable first part is adapted for connection to the second part of the drill collar insert so as to lie at a position proximate the central longitudinal axis of the fluid-containing pipe when in use. A central through bore is provided when the first part is removed.

In one embodiment of the invention, the generator parts are arranged to facilitate removal of the first part while also mitigating the flow disruption and erosion problems associated with wired connections crossing the fluid bore. The coil assembly, in which an electrical current is induced by magnetic coupling, is embedded in a cylindrical outer wall of the drill collar insert instead of being located on the axis of the generator. In one embodiment, electrical wires are arranged as twisted pairs in shallow longitudinal trenches in the stator coil laminations (see FIG. 6A).

In the embodiments of FIGS. 2A-6D, the above-described impeller vanes lie within the same fluid flow path as a set of stator vanes that divert fluid flowing longitudinally along the drill pipe to impart a rotational velocity. That is, fluid flowing parallel to the longitudinal axis of the drill pipe is diverted by the stator vanes such that the fluid flow is partially longitudinal and partially rotational, resulting in a swirling flow having a non-zero angle to the longitudinal axis of the drill pipe. The impeller vanes are arranged to receive this swirling fluid flow generated by the stator vanes and to be rotated within the drill pipe by the force exerted on the vanes by the fluid flow. The stator vanes thus increase the torque provided by the impeller. The stator vanes may be within the removable part of the generator as in FIGS. 2A-2D.

4. Applicability of Embodiments to Repeaters/Telemetry

Generators may be used in repeaters 770a (which includes receiver 760b and transmitter 760c), 770a (which includes receiver 770b and transmitter 770c) (shown in FIG. 7) at intermediate positions along a drill string, such as for telemetry applications. Conventional generators fail to leave a clear drill pipe bore that is sufficient to facilitate 'fishing' to a lower level in the drill string, and this is a considerable constraint because of the high cost of lost drilling time resulting from removal of the drill string. The present invention enables part of the generator to be retrievable without removing the drillstring. This is an advantage for generators that are used to power measuring apparatus close to the drilling location, but the ability to remove a centrally-located part of a generator to permit through access is particularly advantageous when the generator is used for powering a repeater, i.e., repeater 760a or repeater 770a, higher up the drill-string, in view of the likelihood of needing to perform operations lower in the drill string than this repeater 760a or 770a. This is not possible with existing generator assemblies.

In one embodiment of the invention, there is provided an electrical power generator for generating power in a fluid containing pipe, comprising:

a first part for positioning proximate a central longitudinal axis of the pipe when in use, the first part defining a first fluid flow path along the central longitudinal axis; and a second part arranged to lie outside the first part and adjacent an inner wall of the pipe when in use, the second part defining a second fluid flow path. The first part is detachable from the second part and is removable from the drill pipe to provide a clear central bore through the pipe.

In one particular embodiment, the first part of the generator includes a fluid flow control assembly for controlling the flow of fluid along the central longitudinal axis (e.g. by the size of an aperture in a flow nozzle of the flow control assembly), thereby to control the flow of fluid past an impeller within the second fluid flow path. The impeller is coupled to one of a magnet assembly and a coil assembly, to form a rotor, and the second part of the generator includes at least one of the magnet assembly and the coil assembly comprising a stator. The flow control assembly includes a sensor (e.g. pressure, flow rate) that generates a control signal for adjusting the fluid flow, or an adjustment mechanism that is responsive to a control signal generated elsewhere.

In one embodiment, the magnet assembly is the rotor arranged to rotate with the impeller and the coil assembly is the stator having a fixed position relative to the wall of the fluid-containing pipe. The impeller is implemented as an annular component comprising a set of rotor vanes arranged around the circumference of the annular component (preferably equidistant from each other) so as to lie within the outer fluid flow path adjacent the inner wall of the drill pipe. The rotor vanes have a non-zero angle to the received fluid flow (such as an angle of, for example, 20 or 30 degrees to the longitudinal axis of the pipe). The stator coil assembly is also located at the periphery of the drill pipe, surrounding the rotor magnet assembly. By arranging the magnet and coil assemblies towards the periphery of the drill pipe, they have relatively large diameters (within the constraints of the drill pipe dimensions) and this enables a relative movement between them to generate a higher electrical power output than is typical of known downhole generators.

5. Generator with Controllable Output Voltage

Certain embodiments of the invention enable a target output voltage range to be achieved despite variations in fluid flow rates, either by facilitating replacement of at least a part of the fluid flow control assembly (e.g. replacing a fixed-size aperture flow control nozzle with a flow control nozzle having a different fixed-size aperture), or by means of an adaptive flow controller.

In one embodiment, a flow control assembly for use with a fluid-flow-driven electrical power generator comprises an adaptive flow nozzle, which is responsive to conditions within a fluid-flow pipe to adjust the size of its central aperture. In the context of a generator having a first fluid flow path past the impeller and a second central fluid flow path through the flow nozzle's central aperture, the adjustment of the size of the aperture by the adaptive flow nozzle controls the proportion of the total fluid flow passing along the first fluid flow path and the proportion passing along the second fluid flow path, enabling adjustment without replacing a first flow control nozzle with a different size nozzle.

An adaptive flow controller according to one embodiment of the invention uses a control signal representative of a measured impeller rotation speed, a measured hydrostatic pressure of the drilling fluid, a measured fluid flow rate or a measured output voltage from the generator, to control the size of the aperture of the flow controller. This flow controller, in turn, controls the flow of fluid through the annular gap in which the impeller is located. Controlling the fluid flow past the impeller's vanes can maintain a substantially constant output voltage, or at least help to maintain the output voltage within a useable range. In a preferred embodiment, the flow through the impeller's annular chamber is controlled by adjusting the flow control assembly's flow nozzle in response to a measured rotation rate of the impeller. This is directly proportional to output voltage and so provides an effective voltage control mechanism.

6. Avoidance of Electrical Wires in Fluid Bore

In preferred embodiments of the invention as described above, the magnetic coupling between the rotor magnet assembly and its outer stator coil assembly induces an electric current in the coils without the need for a wired electrical connection across the fluid bore. The lack of this wiring removes a restriction on the retrievability of components, and mitigates erosion and fluid flow disruption. The peripheral arrangement of components also enables a sufficiently large clear bore to be provided when part of the generator is detached and removed.

Furthermore, the inventors have determined that multiple twisted pairs of wires can be provided in shallow longitudinal trenches in the relatively large diameter stator laminations, without significantly affecting the generator power output as long as the trenches are relatively shallow.

7. Cylindrical Drill Collar Insert with Impeller Vanes Arranged Between Cylinders Another embodiment of the invention provides an insert for a cylindrical drill collar that comprises one section of a longitudinal drill pipe. The drill collar insert includes a stator coil assembly comprising a plurality of electrical wires wound around a set of one or more magnets. The coil assembly is arranged for magnetic coupling with a rotor magnet assembly that is free to rotate relative to the stator, such that relative movement between the stator coil assembly and the rotor magnet assembly can generate an electric current within the coils. The rotor magnet assembly is arranged to be rotated by torque generated from fluid flow within the drill collar by an impeller coupled to the rotor magnet assembly. The impeller and rotor magnet assembly are interconnected such that rotation of the impeller results in rotation of the rotor magnet assembly. In one embodiment, the impeller comprises a set of vanes arranged between concentric cylinders that form an annular component suitable for positioning towards the outer periphery of the fluid bore. The impeller blades define an angle to the longitudinal axis of the drill collar such that fluid flowing in a substantially longitudinal direction through the bore exerts a force on the vanes to produce rotational movement.

Thus, according to various embodiments of the invention, a generator insert design has been developed in which certain elements can be removed from the flow bore to create a through-bore access path to points lower in the drill string or bottom-hole assembly. Relatively high electrical power can be achieved by means of a circumferentially-located annular power generation assembly, and a controlled power output can be achieved by an adjustment mechanism for an axially-located flow controller. The simple construction of the generator according to preferred embodiments makes it possible to replace the retrieved components at rig site, and downhole replacement is now a possibility.

Further details of various embodiments of the invention are described below with reference to FIGS. 2-7.

8. Generator Embodiment of FIGS. 2A and 2B

A generator according to one embodiment of the invention is shown in FIG. 2A. The generator comprises an annular stator lamination coil pack 252 that is embedded in the housing of a drill collar, and a insert for the drill collar that includes a rotor assembly and a magnet assembly. The rotor assembly includes a retrievable central impeller 220 and magnet assembly 254 which rotates in the fluid flow. Magnetic coupling between the rotating magnets and the annular stator lamination coil pack transfers the mechanical rotating energy for the impeller into the stator coil pack 252 where it is converted into electrical energy.

FIGS. 2B-2D show the retrievable rotor assembly of the generator in more detail. A standard external fishneck 290 is attached directly to a flow-diverting stator 210 comprising a set of vanes, which is locked into the generator housing by a latching mechanism. The latching mechanism provides a thrust bearing element to resist downhole thrust on the rotor and to assist accurate positioning of the rotor. The rotor comprises a set of rotor vanes of an impeller 220 attached directly to the rotor section 254 which contains magnet housing features, an array of rare-earth magnets 256 and a thin outer sleeve of non-magnetic material 258. The rotor runs in mud-lubricated bearings 225 and has a central attachment to the vaned stator 210 so that it is retrieved as one assembly with the stator. The rotor has tungsten carbide bearing surfaces for durability. Although the provision of a removable rotor assembly is advantageous, the solution shown in FIGS. 2A-2D has limitations because of the small diameter of the stator/rotor vane combination (which potentially limits the available torque and the flow rate).

9. Generator Embodiment of FIGS. 3A-6D

Figure 3A:
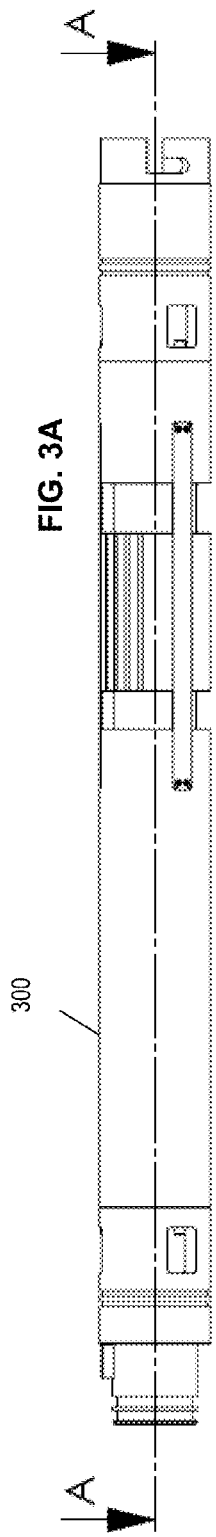
FIG. 3A is a plan view of an insert which fits into a cylindrical drill collar showing components of a second embodiment of a fluid-driven power generator according to the invention, implemented as a drill collar insert.
Figure 3B:
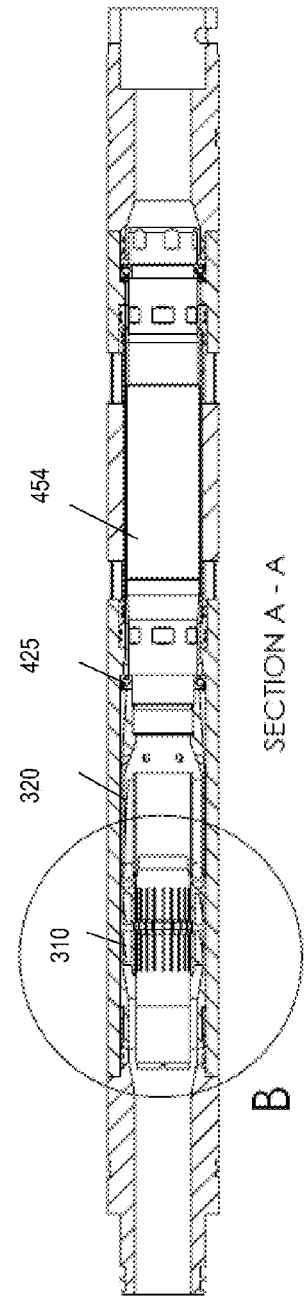
FIG. 3B is a cross sectional view of the insert of FIG. 3A.
Figure 3C:
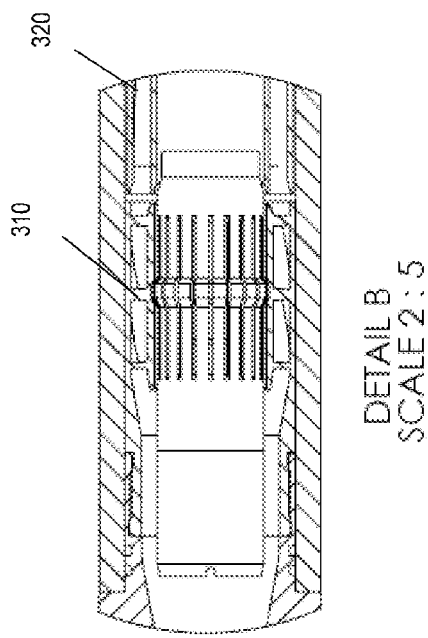
FIG. 3C is cross sectional view of the insert of FIG. 3A showing a detail of FIG. 3B.

A downhole generator assembly according to another embodiment of the invention is shown in FIGS. 3A and 3B, and subsequently in FIGS. 3C-6D. Although these Figures are a scaled representation of a workable embodiment, the invention is not limited to the particular dimensions and materials described herein and the described materials and dimensions are specific implementation features that can be replaced in alternative embodiments within the scope of the invention. Indeed, although embodiments of the present invention are described below with reference to standard component sizes for a drill collar such as may be used in oil and gas exploration and recovery, the principles of the fluid-driven generator of the present invention can be applied to other applications that require power generation within a fluid-containing pipe.

The generator design is based on an insert 300 which fits into a cylindrical drill collar. This drill collar may be a standard 4¾" collar, with the insert having an outer diameter of approximately 4". The generator uses annular flowgear (stator vanes 310 and an impeller 320) which remain within the drill collar during retrieval of other parts of the generator, and during the through-bore operations that are enabled by that retrieval. The vaned impeller 320 is driven by mechanical energy imparted by a fluid flowing through channels defined between a pair of concentric cylinders 325, 330 of the impeller (as described below). The stator vanes 310 impart a swirling rotational movement and this swirling fluid flow applies a torque to the impeller, which is connected to a rotatably mounted magnet assembly, so that the magnet assembly turns relative to a stator coil assembly and induces an electric current in wires around the stator. This generated electrical energy is used to provide power to measurement and/or communication components within the well bore.

Figure 4E:
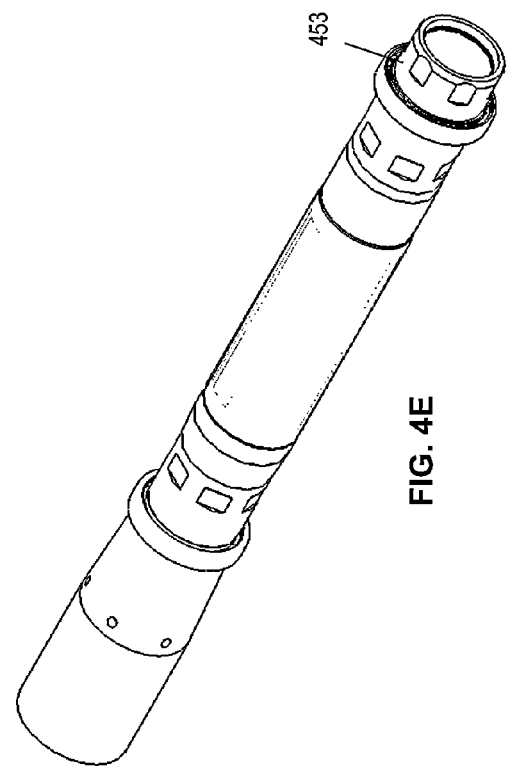
FIG. 4E is a perspective view of the impeller of FIG. 4A.
Figure 4D:
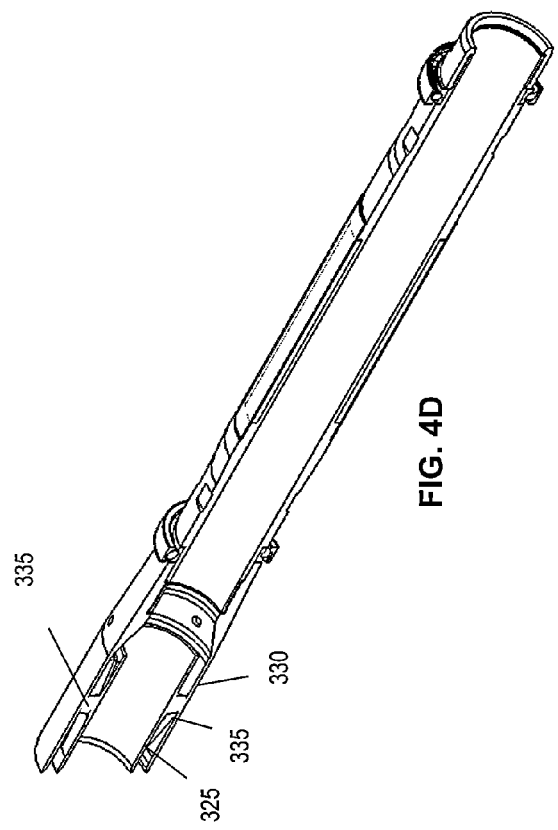
FIG. 4D is a cross sectional perspective view of the impeller of FIG. 4A.
Figure 5F:
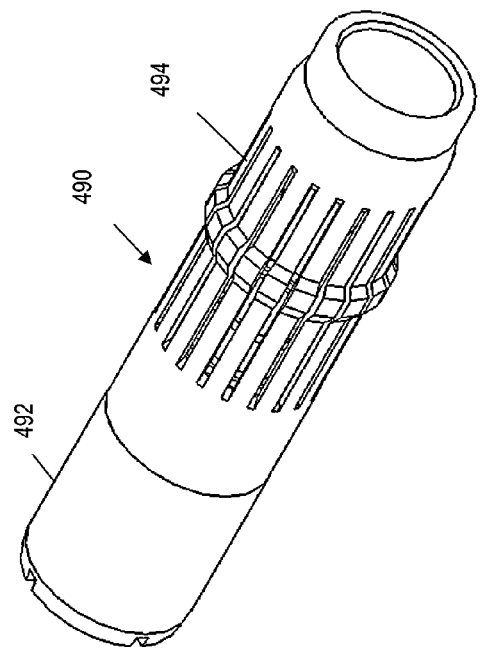
FIG. 5F is a perspective view of the flow control assembly of FIG. 5A.
Figure 5G:
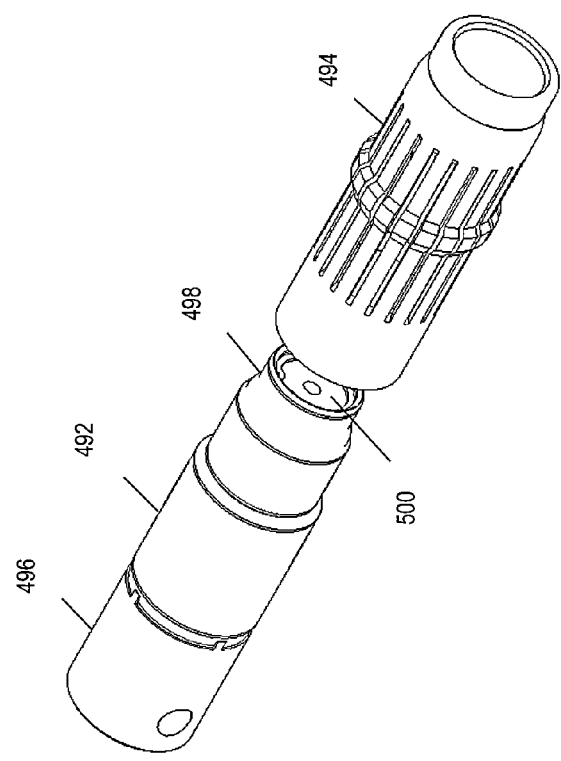
FIG. 5G is an exploded perspective view of the flow control assembly of FIG. 5A.
Figure 6A:
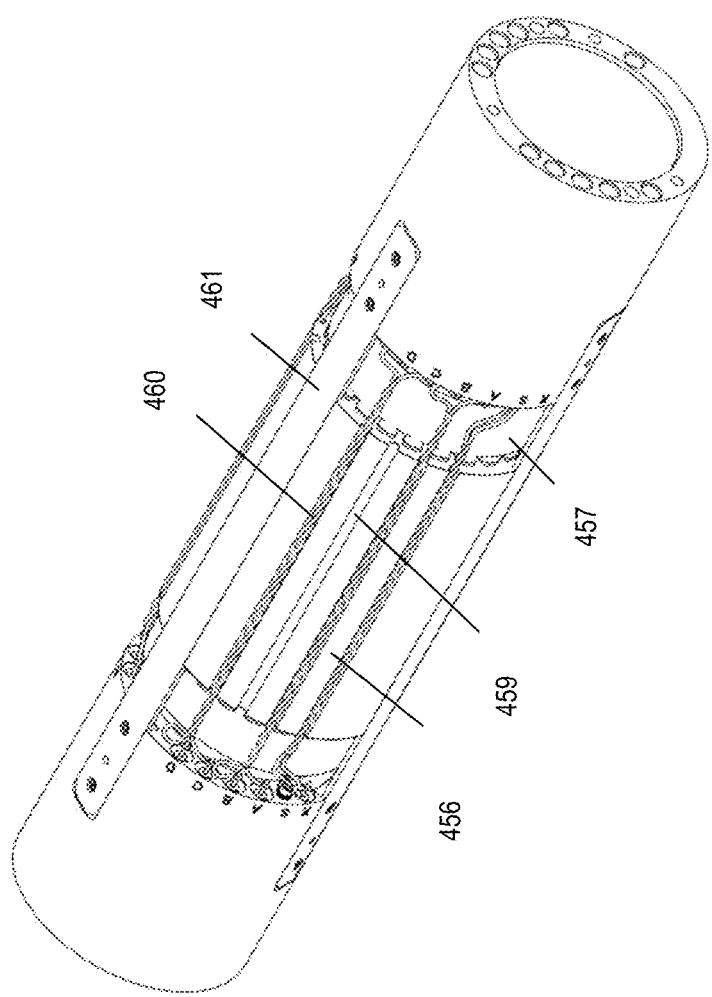
FIG. 6A is a perspective view of a stator.

As shown most clearly in FIGS. 4B and 4D, the impeller 320 is an annular component suitable for locating in close proximity to the inner wall of the cylindrical drill collar, and comprises a pair of concentric cylinders 325, 330 joined together by and integral with a plurality of helical vanes 335 that define fluid flow channels (i.e., a first annular fluid flow path 337) between the cylinders. The impeller is formed of a hard-wearing material—for example a cobalt-chromium alloy such as a Stellite alloy. The impeller vanes 335 are equally spaced around the circumference of the impeller, so as to define a plurality of substantially equal helical fluid flow channels. The vanes define a non-zero angle to the longitudinal axis of the cylindrical drill pipe, such that a substantially longitudinal flow of fluid along the fluid flow path proximate the inner wall of the drill pipe exerts a force on the impeller vanes and causes them to rotate. By providing the impeller vanes 335 and stator vanes 310 as annular components located as far as possible away from the central longitudinal axis of the tool, higher torque can be generated than for conventional on-axis generators.

In the embodiment shown in FIGS. 3A-6D, the impeller vanes are angled at an acute angle (for example 15-40 degrees and preferably around 20-30 degrees) to the longitudinal axis of the concentric cylinders, such that a single vane traverses approximately ⅛ to 1/15 of the circumference of the cylinders. The outer cylinder of the impeller is almost flush with the inner wall of the cylindrical drill collar, but a small fluid flow path remains outside this outer cylinder for the passage of a fluid flow that is useful for cooling and lubricating other components (as explained below). There is generally very little debris within drilling mud when flowing through a drill string down towards the drill bit. The stator vanes are at an angle of approximately 20-50 degrees to the longitudinal axis, and preferably 30-40 degrees.

The inner surface of the outer cylinder of the impeller is formed integrally with an inwardly-tapering portion of the drill collar insert in a direction downhole beyond the end of the inner cylinder. The tapering portion redirects fluid flowing through the impeller's annular gap between the two concentric cylinders to flow towards the longitudinal axis of the cylinders. This tapering portion defines an angle of approximately 20 to 30 degrees to the longitudinal axis, and leads inwards into a further cylindrical portion having an inner surface that aligns with the inner surface of the inner cylinder of the impeller. In the example of a 4" drill collar, this inner cylinder's internal diameter is 2"—a substantial internal bore.

The leading edge of each of the inner and outer cylinders of the impeller (i.e. the edge that faces pressurized fluid flowing through the drill collar) is tapered so as to avoid restricting the fluid flow as well as to reduce the erosion of this leading edge. The impeller and stator vanes are formed of hardened steel, coated with tungsten carbide for improved durability. In the present embodiment, the annular gap between the inner and outer cylinders of the rotor assembly is less than half of the radius of the inner cylinder, and each of the inner and outer cylinders has a thickness of only 2 mm, such that less than one third of the total radius of the drill pipe is take up by the impeller and the stator vanes that cooperate with the impeller. This leaves a significant central through bore. As described above, this through bore enables various operations to be carried out through the drill collar insert if other components of the generator are removed.

The generator also includes a retrievable Flow Control Assembly (490 in FIGS. 5A and 5B), which consists of a fishneck nozzle assembly (or flow controller) 492 formed from high density stainless steel with a hardide coating. This fishneck nozzle assembly has an internal fishneck and accommodates any one of a set of flow nozzles 500, which form a second fluid flow path 593. The nozzles are formed of the same material as the nozzle assembly and are available with a range of sizes of central aperture. Known diameter nozzles for use in such an environment are ⅖, ⅓, ⅘, ⅝, ⅔, and ⅞". The fishneck nozzle assembly attaches to a spring collet 494, for example by a threaded end portion, which latches into the bore of the stator vane housing. The spring collet is described in more detail below with reference to FIGS. 5A-5G.

The entire Flow Control Assembly can be retrieved from the generator using a standard Halliburton Otis 'GS' type running and pulling tool which latches onto the fishneck. The collet latch can then be freed by jarring (if necessary) and then pulling upwards to recover the Flow Control Assembly. Other latch and release mechanisms are equally possible. The Flow Control Assembly can then be replaced downhole, if required.

A collet retention force of the order 300-500 lbs is suitable to resist pressure forces on the nozzle resulting from the drilling fluid flow and downhole vibrations, and to ensure that the Flow Control Assembly remains in place. The collet 494 is formed of titanium and has a substantially cylindrical main body with an outside diameter of approximately 50 mm. A plurality of parallel elongate slots (approximately 70 mm long and 2 mm wide) pass through the walls of the body. The slots in the main body define a plurality of flexible but resilient elongate members, each approximately 6 mm wide and 2 mm-3 mm thick, joining the two ends of the body. The slots allow flexing of the elongate members when forced inwards towards the central longitudinal axis of the cylindrical body, but the elongate members are sufficiently resilient to achieve the desired retention force. Each elongate member has an outwardly-extending projection arranged to cooperate with an annular recess in the drill collar insert's internal surface. The projections project approximately 2.5 mm outwards from the outer surface of the elongate members of the collet, and taper along their length from a maximum length of about 15 mm where the projections join the surface of the collet members and about 9 mm at the outer-most point from the main body of the collet. The flexing of the spring collet needs to be sufficient to enable the projections to be move inwardly by up to 2 mm. The slots through the spring collet are sufficient to enable a fluid flow through the slots, which helps to prevent 'caking' of solid material from the fluid.

FIGS. 5D and 5E illustrate the manner in which the bit nozzle can be changed by unscrewing the fishneck-nozzle assembly 492 from the spring collet 494. When the drill string insert is at rig site, this can be achieved without removing the collet from the generator by a tool that attaches to an adapter 496 which engages on features on the front face 497 of the fishneck housing 492 to enable it to be unscrewed. An O-ring 499 also engages the retention feature on the internal bore of the fishneck housing and permits the fishneck nozzle assembly 492 to be removed.

To change the flow control nozzle 500, the fishneck nozzle housing 492 can be unscrewed from the spring collet 494, and the nozzle released by removing from the fishneck by releasing the retaining circlip 498.

According to one embodiment of the invention, the nozzle can be changed downhole. In some applications, this downhole replacement will be most feasible for the first generator in a string (and possibly only for that first generator unless components are retrieved and replaced in a sequence corresponding to their position in the string, because of the difficulty fishing past an in-place nozzle).

FIGS. 3E and 4B show the rotor assembly which consists of the Rotor-Magnet Assembly 454 which rides in two mud-lubricated hybrid bearings comprising ceramic balls running on metal races 425. The races are of M50 steel coated with TiN, to resist corrosion and enhance surface hardness. The bearings are of angular contact design and are retained on the rotor shaft by the impeller 320 uphole and a nut 453 at the bottom end. A spring between the outer race of the lower bearing and the housing applies an axial load of approximately 250 lb to accommodate wear in the bearings. The magnets 451 are of rare earth magnetic material and are electron beam welded within the rotor magnet assembly to create a unitary body, or are otherwise firmly bonded within the rotor magnet assembly. A thin non-magnetic sleeve 452 protects the magnets.

Although the stator vanes are arranged in direct contact with the inner surface of the drill collar, the outer cylinder of the impeller has a slightly smaller diameter. This leaves a small annular gap of approximately 1.5 mm between the impeller and the collar, into which a relatively small volume of fluid can pass. This small fluid flow lubricates bearings that enable rotation of components of the generator, and cools the electromagnetic components. In a preferred embodiment, no oil seals are required between the magnet assembly and the coil assembly.

Removal of the bearings for replacement is achieved by first removing the upper and lower housings (FIG. 4B), which facilitates access to the central section of the generator. Using a key to hold the rotor vane, the lower nut 453 can be released. The rotor assembly, including the top bearing can then be withdrawn from the generator.

By directly utilizing the magnetic connection between a rotor containing permanent magnets and a wire-wound stator assembly which surrounds it, and by moving the mechanical to electrical energy conversion from an axially-positioned generator into the annular space in the insert, conventional wire connections between the bore and annulus are made unnecessary.

The enhanced diameter of both the permanent magnets and stator coils, that this arrangement permits, makes it feasible to provide generators with higher electrical outputs (i.e. an improvement over the on-axis type of generator). The proximity of stator windings to the flow also facilitates the removal of waste heat, which is an inevitable result of operation at higher electrical outputs whilst avoiding excessive rotation rates.

In addition, the enhanced diameter of the stator coils makes it possible to transfer multiple electrical connections past the generator. This is achieved by passing twisted pairs of wires 460 through shallow longitudinal slots or trenches 459 in the outer surface of the stator laminations 456, as shown in FIGS. 6A-6D.

The use of suitably terminated twisted pairs minimises the electrical noise resulting from the proximity of the wires to the fluctuating magnetic fields associated with the generator stator coil assembly. The shallow trenches are approximately 3 mm deep, and the stator laminations are approximately 15 mm thick. The inventors have determined that it is possible to pass numerous connections over the laminations without reducing the effective area of soft iron in the stator laminations to the point that it compromises generator output. At each end of the stator laminations is a gap 457 separating the stator from an end housing that provides for engagement with other components and typically includes electronics powered by the generator. After the required electrical connections have been formed, the connections are encapsulated in a substantially void-free resin to add structural strength and to protect the electrical connections from the pressure and wear caused by the drilling fluid. The stator is also protected from the bore fluid by a thin non-magnetic sleeve (for example of Inconel alloy).

In one embodiment, the end housing holds an oil reservoir for use to achieve a pressure balance. By equalizing the pressure of the drilling fluid using oil within the reservoir, some constraints on the structural design, such as material thickness, are made less critical or even avoided. Furthermore, a plurality of strengthening struts are provided in shallow trenches in the stator and in the adjacent components of the drill collar insert. These struts are welded into position. The struts are magnetic to cooperate with the magnetic flux generated in the stator and hence to avoid reducing the effectiveness of the stator.

The electromagnetic conversion elements of a generator (i.e. the rotor containing rare earth magnets, and the stator which consists of soft iron laminations wound with copper wire) define the voltage constant of the generator, i.e. the volts per RPM of the generator. A generator according to this invention can be used to power electronic equipment which only operates over a limited voltage range, in which case it can be important to arrange that the blade angles of the flow gear (i.e. the stator vane and rotor vane angles) to give the correct generator rotation rate (and hence voltage) under load. From a prior knowledge of the likely flow rate to be encountered in any particular job the flow angles can be selected. However, to cover a range of possible flow rates it is necessary to stock a wide range of stators and rotors of differing angles. Changing the flow gear in a conventional downhole generator can involve extensive disassembly of the generator.

Using a generator according to one of the preferred embodiments of the present invention, a single combination of stator vane and impeller vane angles can be used over an enhanced range of flow rates by simply changing the size of the central aperture of the bit nozzle 500 in the Flow Control Assembly 492.

In the embodiment of the invention described above, the generator has been designed to simplify changes of flow gear. The stator vane is attached to the lower part of the upper housing as shown in FIG. 4B. Removal of the top housing and the rotor assembly, as described earlier, enables the flow gear and bearings to be readily changed. A further embodiment of the invention is described below.

10. Embodiment of Active Flow Control Nozzle

It is a fundamental characteristic of known generators that the voltage output varies in a linear manner with the rotation rate or RPM. This can be expressed by a number called the Voltage Constant which is determined by the relative geometry and properties of the rotor magnets and the stator laminations.

In turn the rotor vane RPM also varies approximately linearly with flow rate through the generator, so that the variation of voltage output with flow rate is also approximately linear.

The variation of output voltage with flow rate is, at best, an inconvenience which can be overcome within certain limits by electronic means. The flow rates to be used on any job are initially determined by drilling requirements including the need to lift cuttings to the surface. Flow gear angles and nozzle are selected to suit the chosen flow rate. Should the driller subsequently wish to change the flow rate whilst the generator is downhole, there only exists a limited range that can be selected whilst retaining the operating viability of the generator in the configuration selected It then becomes necessary to trip the generator out of the drill hole to change the flowgear. A new generator design according to the above-described embodiment of the invention enables adjustment of the flow rate/RPM characteristic by replacing the flow control nozzle, to suit changed conditions.

However, in an alternative embodiment, a downhole generator is provided with a substantially constant voltage output independent of flow rate or pressure. A generator according to this embodiment employs a replaceable flow control assembly as described above, except that there is no need for a set of interchangeable flow control nozzles having different fixed-size apertures. Instead, an approximately constant voltage output is achieved by means of an active flow control nozzle which responds to changes in fluid flow and varies the bypass rate accordingly. This is achieved by requiring that the bypass rate is higher at lower flow rates; the bypass rate can be decreased as the flow rate increases so that the actual flow through the generator's flow-driven impeller is more consistent. Furthermore, since the relationship between the fluid flow rate and rotation speed of the impeller varies according to load, some embodiments of the invention monitor the rotation speed of the impeller or the output voltage of the generator, rather than only monitoring the fluid flow rate or the fluid pressure.

The active flow-control nozzle needs to respond to increased flow rate by opening and permitting an increased proportion of the flow to pass through the bypass. This can be achieved relatively simply by means of a spring loaded orifice which responds to fluid pressure, but other mechanisms for controlling the active control nozzle can be used and one effective solution exploits the electromagnetic coupling between the magnets 451 of the rotor-magnet assembly and the stator 455 to measure the speed of rotation of the impeller. Another solution samples the output voltage and uses this to generate a feedback control signal that is transmitted to a low-power electronic nozzle controller via similar electromagnetic coupling. Only a low strength signal is required for transmitting control signals to the electronic nozzle controller. The electronic controller widens or restricts the flow nozzle aperture to adjust the flow rate past the impeller to achieve a target speed of rotation that results in a target voltage.

Time lags within the system prevent instantaneous adjustment, and so some variation in output voltage is to be expected, but output voltage variations can be controlled so as to remain within the voltage range that is acceptable to the particular electronics being powered by the generator.

The result is a reduction in unintended variation of generator output with changes to the fluid flow rate or pressure in the fluid-containing pipe, thereby increasing the usable range of flow rates which can be accommodated with any configuration of flow gear. In addition, intentional changes in electrical output can be achieved using the same flow gear by switching flow control nozzles or by controlling an adjustable flow control nozzle.

An active nozzle as described above can be retrofitted in the space occupied by the replaceable static nozzles, although variations in design of the flow control assembly to accommodate variations in the active nozzle are within the scope of the invention.

Various embodiments of the invention described above thus provide advantages over known apparatus, including a replaceable central assembly within a generator for use in fluid-containing pipes, which can be removed downhole to permit access through the bore to positions lower in drill string. The above-described flow control assembly incorporating exchangeable nozzles can be used to set a desired flow bypass ratio, making a single flowgear stator-rotor angle combination work over a wide range of flow rates by simple change of nozzle size. Downhole adjustment is simplified by providing the ability to change a nozzle without removing the rest of the flow control assembly from the drill pipe (using an adaptor to engage and unscrew the nozzle assembly from the fishneck housing of the flow control assembly). This simple design can improve reliability and serviceability compared with typical known solutions. Embodiments have been described that use relatively large diameter annular components, including a relatively large diameter coil assembly and annular flow gear, to achieve higher power outputs. Furthermore, an active control nozzle has been provided to reduce the variation of voltage output with flow rate through the pipe, giving a more nearly constant voltage output. It will be clear to a person skilled in the art that the complementary nature of the various features of the invention can provide significant improvements over known generators, and yet several of the described features are not essential to all embodiments. For example, the removability of parts of a generator does not require an active flow control nozzle and vice versa.

The annular arrangement of the electrical windings according to one embodiment removes the need for wired electrical connections across the fluid bore, as required in a typical axially-mounted generator that supplies electricity to an annular insert. This annular arrangement of stator windings also creates space for electrical connections through the generator. Direct contact between the stator windings and the drilling fluid maximise the cooling effect.

Although a number of embodiments are described in detail above, the present invention encompasses various alternative implementations including additional features and modification of the features described above. For example, the above-described embodiments include a coil assembly and a rotating magnet assembly that induces an electric current in the coil assembly to power components such as a telemetry repeater, i.e., repeater 760a or repeater 770a shown in FIG. 7, or a measurement apparatus. In one embodiment, the electrical current generated in this way is used to replenish a battery that is then used to provide a steady output voltage for powering downhole components. In another embodiment, the output voltage generated by the generator is processed to remove any excessive voltages reaching the powered measurement or telemetry components.

Figure 7:
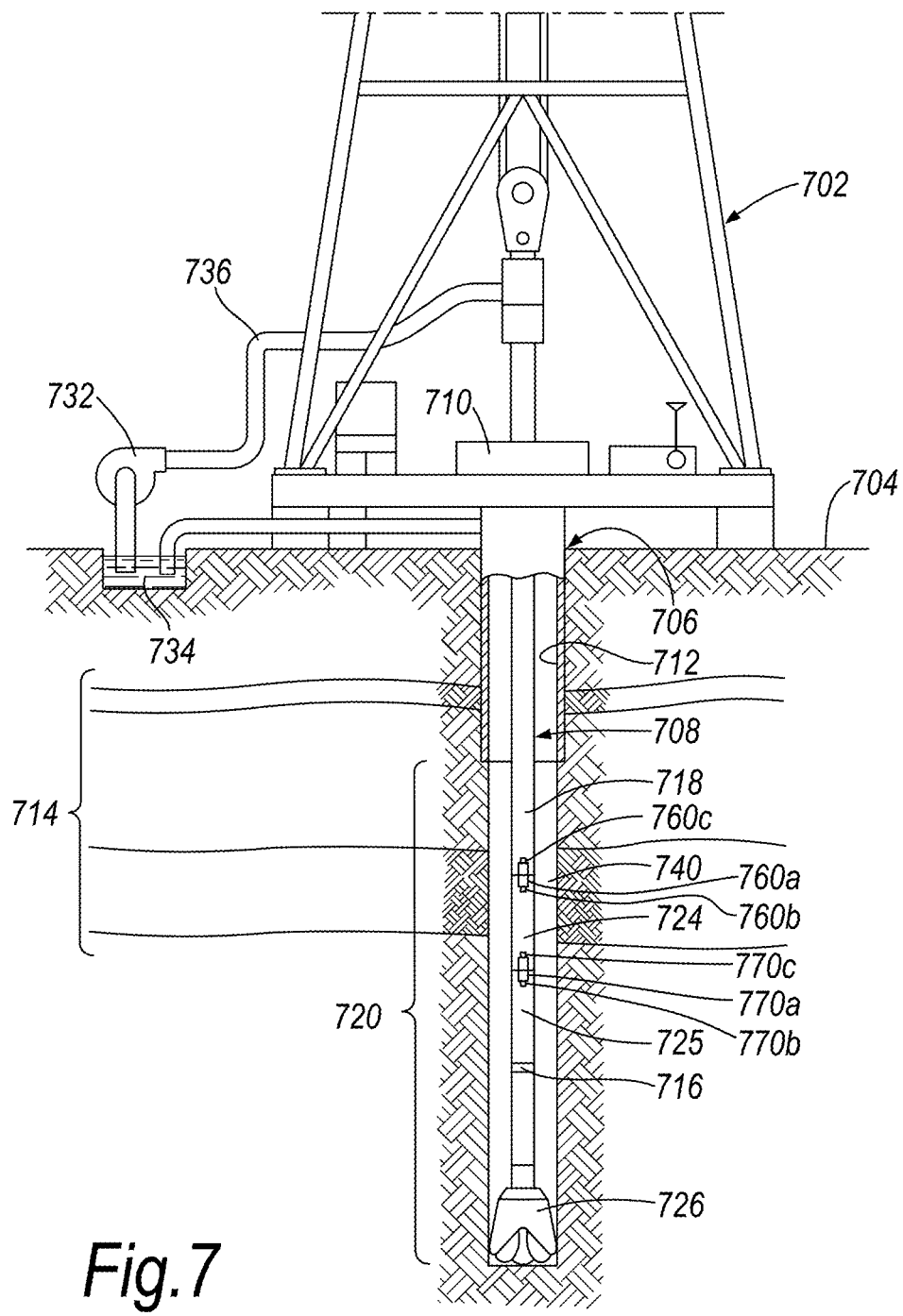
FIG. 7 shows a measurement while drilling apparatus according to an embodiment of the invention.

Electrical power generators according to the present invention are particularly applicable to logging while drilling (LWD) and measurement while drilling (MWD) applications. FIG. 7 illustrates a drilling rig 702 supporting a drill string 708 that includes signal transmitters and receivers for use in the measurement of formation resistivity, and/or other apparatus for measurement of conditions of the downhole environment. Each transmitter and receiver and other electrically powered component requires power to be supplied from the surface or generated downhole, or reliance must be placed on batteries that require periodic replacement. When drilling to great depths, downhole power generation is the most effective solution. There may also be a need for signal repeaters, i.e., repeaters 760a and 770a, to be located at intervals along the drill string, to enable formation resistivity data and data relating to other measured properties of the downhole environment to be transmitted from the measurement point near the drilling location to a surface location, where it is analyzed and used to control subsequent operations. The present invention mitigates a number of problems associated with conventional downhole power generators.

As shown in FIG. 7, a drilling rig 702 located at a surface 704 of a well 706 supports a drill string 708. The drill string may operate to penetrate a rotary table 710 for drilling a borehole 712 through subsurface formations 714. The drill string 708 incorporates a drill pipe 718 and a bottom hole assembly 720. The bottom hole assembly 720 includes a number of interconnected drill collars 724, a downhole tool 716 and a drill bit 726. The drill bit is operated to create the borehole 712 by penetrating the surface 704 and subsurface formations 714. A mud pump 732 pumps drilling fluid (sometimes known as "drilling mud") from a mud pit 734 through a hose 736 into the drill pipe 718 and down to the drill bit 726. The drilling fluid can flow out of the drill bit 726 and can be returned to the surface 704 through an annular area 740 between the drill pipe 718 and the sides of the borehole 712. The drilling fluid may then be returned to the mud pit 734, where it is filtered. The drilling fluid typically cools the drill bit as well as providing lubrication and removing subsurface formation cuttings created by operating the drill bit.

The downhole tool 716 may comprise a number of different types of tools, including MWD (measurement while drilling) and LWD (logging while drilling) tools and others. The drill string 708 may incorporate one or more transmitters and one of more receivers 716 for generation and reception of signals and then analysis of conditions within the drilling environment, such as near the drill bit. For example, measurement while drilling (MWD) applications may exploit such transmitters and receivers to measure formation resistivity in a region close to the drill bit, for example to detect formation boundaries via detecting changes in resistivity and to control steering of the drill bit in response to this detection to direct the drill bit towards desired fossil fuel supplies, or to identify the fluids in a material. An electromagnetic wave can be transmitted into the formation surrounding a drilling location, and the resulting response signals provide information about the downhole environment. The present invention can provide electrical power to components of the MWD system while mitigating a number of problems of known MWD systems.

The invention claimed is:

1. An electrical power generator, for use in a fluid-containing pipe, comprising:
   an annular power generation assembly comprising a fluid-flow-driven impeller connected to one of a magnet assembly or an electrical coil assembly, the magnet assembly and the coil assembly being arranged for magnetic coupling between them and being mounted to enable relative movement between them, such that fluid flowing past the impeller causes relative rotation between the magnet assembly and the coil assembly for the generation of electrical power;
   a flow controller located closer to the longitudinal axis of the pipe than the annular power generation assembly, which flow controller is detachable from the annular power generation assembly and can be removed to leave an axially-located through bore;
   a first fluid flow path past the impeller and a second fluid flow path through an aperture of the flow controller, wherein the flow controller includes an adjustment mechanism for adjusting the size of the aperture of the flow controller to control the proportion of the fluid flowing within the pipe that flows past the impeller in the first fluid flow path; and
   an output voltage detector that generates a signal indicative of the output voltage, and wherein the flow controller is responsive to the signal indicative of the output voltage to automatically adjust the size of the aperture of the nozzle to control the flow of fluid past the impeller, thereby to provide feedback control of the output voltage;
   wherein the flow controller comprises an adaptive flow control nozzle and is responsive to conditions within the fluid-containing pipe to automatically adjust the size of the aperture of the adaptive flow control nozzle.

2. The generator of claim 1, including a sensor selected from the group comprising a pressure sensor and a fluid flow rate sensor, which sensor generates a signal indicative of sensed conditions within the fluid-containing pipe, and wherein the flow controller is responsive to the signal indicative of sensed conditions to automatically adjust the size of the aperture of the flow control nozzle.

3. The generator according to claim 1, wherein the first fluid flow path is located towards the outer circumference of the pipe.

4. An electrical power generator, for use in a fluid-containing pipe, comprising:
- a magnet assembly;
- a coil assembly;
- a fluid-flow-driven impeller connected to one of the magnet assembly and the coil assembly so as to cause rotation of the connected assembly in response to fluid flow through the pipe;
- wherein the magnet assembly and the coil assembly are arranged to enable magnetic coupling between them, and the magnet assembly and the coil assembly are mounted to enable relative movement between them in response to fluid flow through the pipe, such that said relative movement generates an electric current within the coil assembly; and
- a fluid flow controller including at least one sensor and a flow control nozzle having a fluid flow aperture and an adjustment mechanism, the fluid flow controller being detachable from the electrical power generator;
- wherein the impeller is located within a first fluid flow path and the fluid flow controller is located within a second fluid flow path within the fluid-containing pipe, and the fluid flow controller's adjustment mechanism provides adjustment of the fluid flow aperture in response to conditions in the fluid containing pipe detected by the sensor, thereby to control the proportion of fluid flowing in the pipe that flows through the first fluid flow path.

5. A fluid flow controller for use in a fluid-containing pipe, comprising:
- at least one sensor for measuring conditions in the fluid-containing pipe; and
- a flow controller having a fluid flow aperture and an adjustment mechanism;
- wherein the flow controller is detachably couplable to an electrical power generator and is responsive to signals indicative of conditions in the fluid-containing pipe, which conditions are measured by the at least one sensor, to adjust the size of the fluid flow aperture using the adjustment mechanism.

6. A measurement while drilling (MWD) system comprising:
- a drilling platform; and
- a drill string comprising:
  - a fluid-containing pipe through which drilling fluid can be pumped to lubricate the drill head,
  - at least one sensor for measuring conditions in the fluid-containing pipe, and
  - an attachable flow control nozzle having a fluid flow aperture and an adjustment mechanism,
  - wherein the flow controller is responsive to signals indicative of conditions in the fluid-containing pipe, which conditions are measured by the at least one sensor, to adjust the size of the fluid flow aperture using the adjustment mechanism.

7. An apparatus comprising:
- a housing;
- a cylindrical stator positioned within the housing such that there is an annular gap between an outer surface of the cylindrical stator and an inner surface of the housing;
- a rotor mounted within the stator;
- a pipe within the rotor;
- a fluid-flow-driven impeller connected to but separate from the rotor so as to cause rotation of the rotor in response to fluid flow through the pipe;
- wherein the stator and the rotor are arranged to enable magnetic coupling between them, and the stator and the rotor are mounted to enable relative movement between them in response to fluid flow through the pipe, such that said relative movement generates an electric current within the rotor; and
- a slot cut in the outer surface of the cylindrical stator forming a channel along the inner surface of the housing from a first end of the cylindrical stator to a second end of the cylindrical stator.

8. The apparatus of claim 7 further comprising a wire passing through the slot from the first end of the cylindrical stator to the second end of the cylindrical stator.

9. The apparatus of claim 7 further comprising:
- an end housing mounted within the housing such that there is an end-housing gap between the stator and the end housing.

10. The apparatus of claim 9 further comprising:
- an oil reservoir contained within the end-housing gap.

* * * * *